UNITED STATES PATENT OFFICE.

FREDERICK S. BARFF, OF KILBURN, COUNTY OF MIDDLESEX, AND ALFRED P. WIRE, OF LEYTONSTONE, COUNTY OF ESSEX, ENGLAND.

PREPARATION OF EXTRACTS OF MEAT.

SPECIFICATION forming part of Letters Patent No. 273,800, dated March 13, 1883.

Application filed December 30, 1882. (No specimens.) Patented in England November 22, 1882, No. 5,565.

*To all whom it may concern:*

Be it known that we, FREDERICK SETTLE BARFF and ALFRED PHILIP WIRE, subjects of the Queen of Great Britain, and residing respectively at 100 Abbey Road, Kilburn, in the county of Middlesex, and Leytonstone, in the county of Essex, both in the Kingdom of England, have invented certain Improvements in the Preparation of Extracts of Meat, (for which we have obtained a patent in Great Britain, No. 5,565, dated November 22, 1882,) of which the the following is a specification.

This invention relates to the preparation of the juices of meat, containing all the soluble albumen therein, for alimentary purposes, and as an example of carrying out the process we will describe the operation as applied to the production of about one gallon of the extract.

We first take about five pounds in weight of lean and fresh-killed meat free from fat, skin, and bone. This is minced to very fine proportions. To this we add about five pints of clean filtered water, preferably water which has been boiled and allowed to cool to about 140° Fahrenheit. The addition of the meat further cools the water, and the temperature of the whole is again raised to about 140° Fahrenheit, the magma being kept well agitated during the operation. It is then passed through a hair or other sieve for the purpose of freeing it from solid matter, and the heavier matter may be squeezed, so as to obtain as much of the liquor as possible from this operation. While on the sieve the meat may be washed by water, preferably at about 140° Fahrenheit, and this may in quantity be about a pint for the weight of meat given, and may be passed into the meat in a divided state from a fine rose. The fluid extract so obtained is then allowed to stand and cool until any fat contained therein is solidified. This fat is then removed, and the resulting liquid is strained through a flannel or other filtering or straining medium for the purpose of removing any fat which may still remain therein.

The fibrine and other solid matter in suspension is then removed from the liquid by placing the liquid in a water-jacketed vessel, and gently raising the temperature to about 130° Fahrenheit, this temperature being maintained for a period not less than fifteen minutes, when these matters cohere and fall to the bottom. At about this period we add to this liquid common salt, (say about three-fourths ounce for the quantity of meat given,) any desired flavoring, and for the purpose of preserving the extract dissolve therewith some of Barff's boro-glyceride in a glacial form, (say about two ounces for the quantity of meat given.) The liquid is again filtered for the purpose of removing any solid matter which may remain in suspension. In place of the boro-glyceride any other suitable antiseptic or preservative agent may be employed. The resulting liquid is then ready for use, and may be employed for medicinal and domestic purposes.

Although we have mentioned five pounds of meat as the quantity treated, yet any quantity can be so treated, adhering to the relative proportions named, or thereabout.

We are aware that meat extract has been prepared by mincing meat, adding water thereto, heating the mixture, and then straining it and removing the solidified fat from the liquid thus obtained. By our process, however, we, after removing the solidified fat, subject the liquid to a further gentle heating to about 130° degrees Fahrenheit, as hereinbefore specified, with a view to putting the fibrine and other solid matters still remaining in suspension in a condition ready for removal, and we then remove them, thus obtaining a liquid extract which is free from these matters.

We claim—

The improvements in the preparation of extracts of meat, consisting in mincing or dividing the meat and adding thereto water, and agitating the mass or magma at a temperature of about 140° Fahrenheit, and afterward straining or straining and pressing for separating the solid from the fluid parts, and subsequently removing the fibrine and other solid matter in suspension therefrom by raising the temperature, substantially as hereinbefore described, and thus obtaining a solution of flesh or meat albumen free from fat and fibrine.

In testimony whereof we have signed our names to this specification in the presence of two subscribing witnesses.

FRED. S. BARFF.
    ALFRED P. WIRE.

Witnesses:
 CHAS. MILLS,
  47 *Lincoln's Inn Fields, London.*
 RUDOLF BRADEN.
  31 *Lombard Street, London.*